Patented Oct. 8, 1929

1,730,402

UNITED STATES PATENT OFFICE

HENRY H. ABBOTT, OF NEW YORK, N. Y., AND GEORGE W. KUHN, OF GLEN ROCK, NEW JERSEY, ASSIGNORS TO AMERICAN TELEPHONE AND TELEGRAPH COMPANY, A CORPORATION OF NEW YORK

TESTING APPARATUS FOR ELECTRICAL CIRCUITS

Application filed March 28, 1928. Serial No. 265,416.

This invention relates to improved testing apparatus for locating faults on electrical circuits.

The method of testing a line to locate the position thereon of a fault, such as a ground, which is utilized with the arrangements of the invention, is the so-called "Varley" method. A brief description of this method will be given hereinafter. The primary object of the arrangements of the invention is to provide improved apparatus for carrying out certain steps in the method. Other features and objects of the invention will appear more fully from the detailed description hereinafter given.

Figure 1:
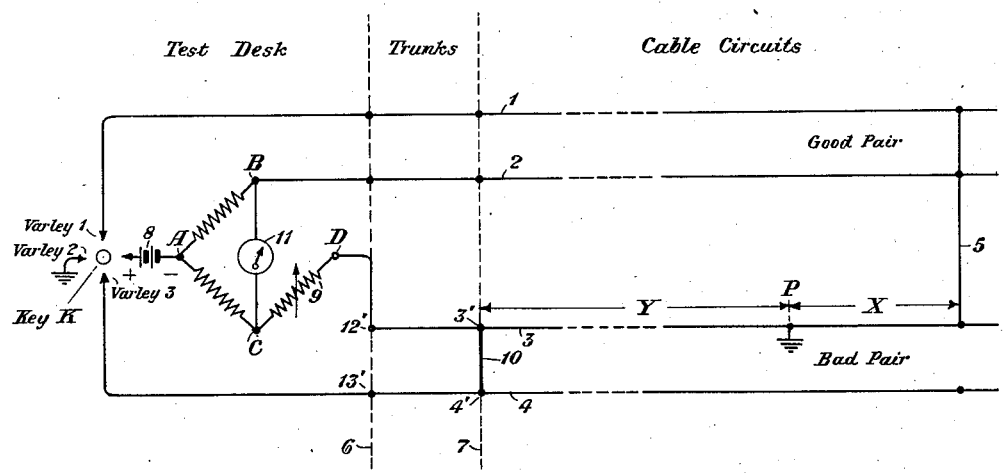
Figure 2:
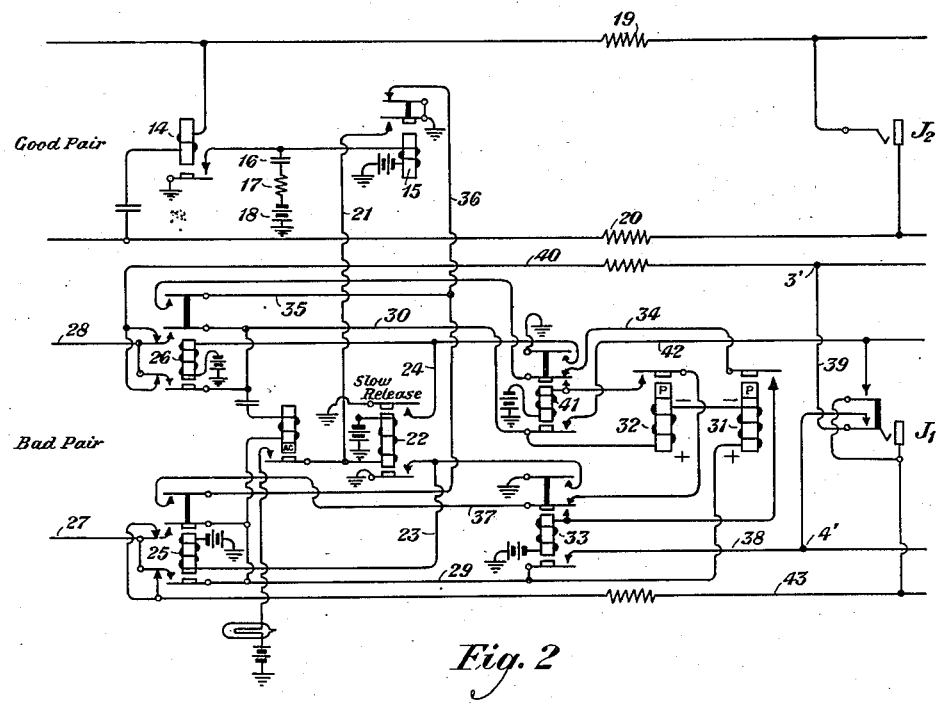

The invention may be more fully understood from the following description, together with the accompanying drawing, in the Figures 1 and 2 of which the invention is illustrated. In Fig. 1 is shown a diagram illustrating the Varley method of testing to locate faults existing on an electrical circuit. Fig. 2 is a circuit diagram illustrating a preferred form of the invention.

In Fig. 1 there is shown to the left of the dotted line 6 apparatus which would be located at a test desk at an office from which the tests are made. This apparatus would be connected by trunks indicated between the dotted lines 6 and 7 to a central office wherein would terminate circuits, such as the cable circuits 1, 2, and 3, 4, which it would be desired to test for the purpose of locating a fault thereon, such, for example, as the ground on cable 3 at point P. The apparatus at the test desk would include a Wheatstone bridge arrangement having an arm AB, an arm AC and an arm CD. The arm CD would have included therein a variable resistance 9. A galvanometer 11 would be connected across point B and C and a battery 8 would be connected to point A.

Let it be assumed that it is desired to make a test to determine the location of a fault, such as a ground at point P, on the conductor 3 of the circuit 3, 4. Connections will then be established from the test desk to the conductors 3 and 4 of the bad pair and to the conductors, such as 1 and 2, of any other good pair. The point B will be connected to one good wire, such as 2, and the point D will be connected to the bad wire 3. At the far end of the cable circuits the two good wires 1 and 2 and the bad wire 3 will all be connected together, as by the conductor 5.

At the test desk is provided a three-position key K. To conduct a Varley test the key will be thrown to a forward position. This will connect battery 8 to the conductor entitled Varley 1 connected to line 1. The variable resistance 9 will then be adjusted until the galvanometer 11 shows no deflection and the value of resistance 9 noted. The key K will then be thrown to the middle position. This will ground battery 8. It is pointed out that at the other opposite junction point of the Wheatstone bridge arms ground exists at point P on line 3. The resistance arm 9 will again be adjusted and the reading noted. The key K will now be thrown to the downward position. This will connect battery 8 to conductor 3 by way of conductor 4 over circuit 10. Again the resistance 9 will be adjusted and its reading taken. By means of these three readings, as procured by the three distinct steps in the Varley method, it is possible to solve for the values of X and Y and hence to determine the exact location of the point P at which the faulty condition exists. As the Varley method of testing is well known in the art no further detailed description thereof will be given.

It is pointed out that the arrangements of the invention provide improved apparatus for accomplishing the third step of the Varley test, which comprises connecting battery 8 to point 3' by way of point 4' of conductor 4. This is to arrange for the elimination of the value of the conductor 12', 3' of the trunk connecting the test desk to the cable. If a direct connection, such as 10, were used between points 4' and 3', it would be necessary to have an attendant at the office where the trunk and cable terminate to establish such connection. In the arrangements of the invention this connection, shown as 10 in Fig. 1, is established by a series of relay arrangements controlled by the operator at the test desk.

The invention may be more fully understood from reference to Fig. 2 in which is shown a circuit diagram of the arrangements of the invention. These arrangements are located in the trunk circuits at the junction point of the trunk and cable circuits, such as shown by the dotted line 7 of Fig. 1. Similar reference characters have been utilized to denote like parts in both of the figures of the invention.

It is pointed out that when the key K is thrown to the downward position for the third step of the Varley method, ringing current will be momentarily transmitted out over the good pair of wires, such as the wires 1 and 2. Also, when the key is restored from the downward position, or the Varley 3 position, ringing current will again be momentarily sent out over the good pair of conductors. Accordingly, when the key is thrown to the Varley 3 position, ringing current will be transmitted over the conductors of the trunk connected to conductors 1 and 2 and will operate the relay 14. It is pointed out that there will be included in these conductors the resistance elements 19 and 20, so that the effect of the short circuit at the distant end of the cable will not be great enough to prevent this ringing current from actuating relay 14. The operation of relay 14 will close a circuit and operate the relay 15. An arrangement comprising a condenser 16, a resistance 17 and a battery 18 connected to ground from this circuit is provided to ensure stability in the operation of relay 15. The operation of relay 15 will connect ground to the conductor 21 and through the winding of the slow release relay 22 to battery and ground, thereby operating relay 22. The operation of relay 22 will connect ground to the conductors 23 and 24 and thence to the relays 25 and 26 and operate relays 25 and 26. The operation of relay 25 will disconnect the conductor 27 of the trunk from the conductor 4 (not shown, connected to the sleeve of jack $J_1$) and will connect conductor 27 to conductor 29. The operation of relay 26 will disconnect the conductor 28 of the trunk circuit from conductor 40, which would be connected through the jack $J_1$ to the conductor 3 and would connect conductor 28 to conductor 30. In other words, the operation of relays 25 and 26 will bridge across conductors 27 and 28 a circuit including in series therein the polar relays 31 and 32. These polar relays will be so arranged that when battery is connected to conductor 27 only one of said relays, such, for example, as 31, will operate, and when battery is connected to conductor 28 only the other of said relays, such as 32, will operate. Let it be assumed that at the test desk the point D has been connected to conductor 28 and the battery 8 has been connected to conductor 27. Accordingly, this will operate the relay 31. It is pointed out that by this time the momentary surge of ringing current transmitted over the other trunk circuit will have stopped and relay 15 will have released. This will remove ground from the relay 22. However, as this relay is a slow release relay, it will remain operated for the moment. The operation of relay 31 will accordingly close the following circuit: from ground, contact of relay 15, conductor 36, conductor 35, contact of relay 26, contact of relay 41, conductor 34, contact of relay 31, winding of relay 33, to battery and ground, thereby operating relay 33. The operation of relay 33 will close a locking circuit for said relay over conductor 37, upper contact of relay 25, to conductor 36 and thence to ground. A locking circuit for relay 25 will also be closed over conductor 23, upper contact of relay 33, to ground. Accordingly, relays 33 and 25 will remain operated when the relay 22 releases. The release of relay 22 will now cause the relay 26 to release. This will disconnect the bridge across conductors 27 and 28, which include the two polar relays 31 and 32. The bridge across conductors 27 and 28 will now be completed from conductor 29, lower contact of relay 33, conductor 38, point 4', which might correspond to point 4' of Fig. 1, contact of jack $J_1$, conductor 39, point 3', which might correspond to point 3' of Fig. 1, and thence over conductor 40 and contact of relay 26 to conductor 28. Accordingly, it will be seen that the momentary application of ringing current to the good pair of conductors will close a direct path between conductors 27 and 28, or in other words, between such points as point 3' and point 4' of Fig. 1. At the same time the connection between conductor 27 and conductor 4 will be held open at the contacts of relay 25. When the third step of the Varley test is completed and the key is restored to the middle position, a momentary surge of ringing current will again be transmitted over the conductors of the good pair and will operate the relays 14 and 15. It is pointed out that at this time relays 33 and 25 are operated and held locked up over the ground connected to conductor 36. Relay 26, however, has been released as no locking circuit therefor had been previously closed, due to the fact that neither relays 32 nor 41 had operated. Accordingly, this momentary surge of ringing current, with the attendant operation of relay 15, will remove ground from conductor 36, thereby opening the locking circuits for relays 25 and 33. This will restore the apparatus to normal.

In a similar manner if connections should be established at the test desk whereby the point D should be connected to conductor 27, and the battery B should be connected to conductor 28, the momentary application of ringing current over the good pair would cause the polar relay 32 to operate. This would cause the relays 41 and 26 to become locked up and would establish a connection between conductor 28 and conductor 27 as follows: from conductor 28, contact of relay 26, conductor 30, lower contact of relay 41, conductor 42, contact of jack $J_1$, and thence over conductor 43 to conductor 27.

While the arrangements of the invention have been disclosed as embodied in certain specific arrangements which are deemed desirable, it is understood that they are capable of embodiment in many and other varied forms without departing from the spirit of the invention as defined by the appended claims.

What is claimed is:

1. In a system for testing for the location of faults on electrical circuits comprising testing apparatus, a good pair of lines, a bad pair of lines, and two trunks for connecting said testing apparatus to said pairs of lines; signal responsive means in said trunk connected to said good pair of lines, means in said second trunk controlled by said signal means for closing a circuit across the conductors of said second trunk, and means in said circuit responsive to currents of different polarity for closing another circuit across the conductors of said second trunk.

2. In a system for testing for the location of faults on electrical circuits comprising testing apparatus, a good pair of lines, a bad pair of lines, and two trunks for connecting said testing apparatus to said pairs of lines; signal responsive means in said trunk connected to said good pair of lines, means in said second trunk controlled by said signal means for temporarily closing a circuit across the conductor of said second trunk, two polar relays in said circuit each arranged to operate on current of opposite polarity to the other, and means controlled by each polar relay for interconnecting the conductors of said second trunk through different circuit arrangements.

3. In a system for testing for the location of faults on electrical circuits comprising testing apparatus, a good pair of lines, a bad pair of lines, and two trunks for connecting said testing apparatus to said pairs of lines; signal responsive means in said trunk connected to said good pair of lines, means in said second trunk controlled by said signal means for temporarily closing a circuit across the conductors of said second trunk, two polar relays in said circuit each arranged to operate on current of opposite polarity to the other, and means controlled by each polar relay for connecting a circuit across the conductors of said second trunk and for disconnecting one of the conductors of said trunk from the conductor of said bad pair of lines normally connected thereto.

4. In a system for testing for the location of faults on electrical circuits comprising testing apparatus, a good pair of lines, a bad pair of lines, and two trunks for connecting said testing apparatus to said pairs of lines; a bridge across the conductors of said trunk connected to said good pair of lines, resistance elements in said conductors between said bridge and said good pair of lines, signal responsive means in said bridge, means in said second trunk controlled by the operation of said signal responsive means for closing a circuit across the conductors of said second trunk, and means in said circuit responsive to currents of different polarity for closing another circuit across the conductors of said second trunk.

5. In a system for testing for the location of faults on electrical circuits comprising testing apparatus, a good pair of lines, a bad pair of lines, and two trunks for connecting said testing apparatus to said pairs of lines; signal responsive means in said trunk connected to said good pair of lines, means in said second trunk controlled by the initial operation of said signal responsive means for temporarily closing a circuit across the conductors of said second trunk, means in said circuit responsive to currents of different polarity for closing another circuit across the conductors of said second trunk, and means controlled by the release of said first signal responsive means for holding closed said last mentioned circuit across the conductors of said second trunk.

In testimony whereof, we have signed our names to this specification this 27th day of March, 1928.

HENRY H. ABBOTT.
GEORGE W. KUHN.